June 17, 1969   R. D. SCHOLL   3,450,863
THERMAL STABILIZER FOR THERMALLY SENSITIVE COMPONENTS
Filed June 19, 1967
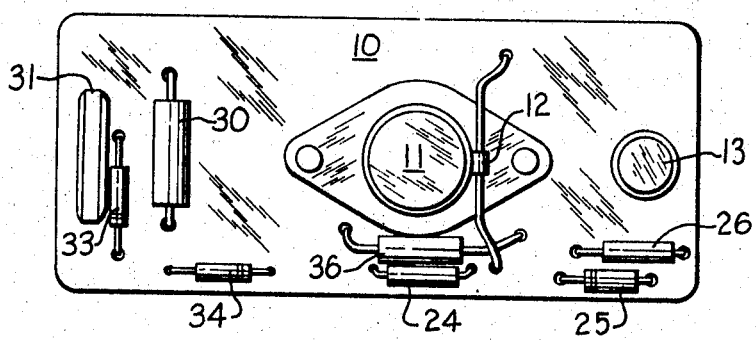
Fig-1.
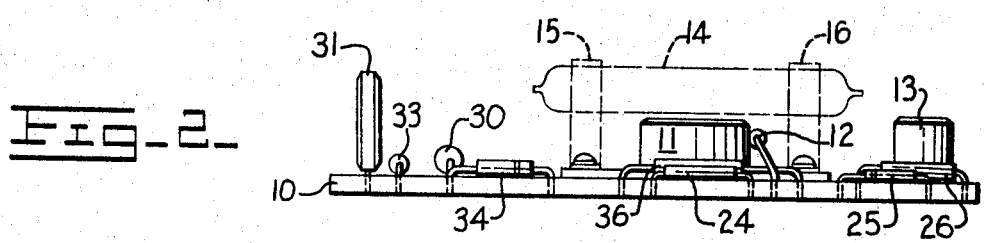
Fig-2.
Fig-3.
INVENTOR.
ROLLAND D. SCHOLL
BY
Fryer, Tjensvold, Feix, Phillips & Lempio
ATTORNEYS

United States Patent Office 3,450,863
Patented June 17, 1969

3,450,863
THERMAL STABILIZER FOR THERMALLY SENSITIVE COMPONENTS
Rolland D. Scholl, Peoria, Ill., assignor to Caterpillar Tractor Co., Peoria, Ill., a corporation of California
Filed June 19, 1967, Ser. No. 646,807
Int. Cl. H05b 1/02
U.S. Cl. 219—501                                    2 Claims

ABSTRACT OF THE DISCLOSURE

A temperature-regulating device for maintaining a thermally sensitive component at a constant temperature during changes in the ambient temperature, which regulating device uses a power transistor to add heat to the system, with the conduction of the transistor being controlled in response to changes in the temperature of the thermally sensitive component so stabilized. The thermally sensitive component is mounted in a heat-transfer relationship with the power transistor.

Background of the invention

Many components require a constant temperature environment for efficient operation and to supply repeatable reference indications. For example, the reference junction of a thermocouple must be maintained at a constant temperature if accurate temperature measurements are to be made with the thermocouple. In the past, various temperature regulating devices have been used to maintain thermocouple junctions or like components at a fixed temperature.

Electrolytic potentiometers are another example of components sensitive to changes in their environmental temperature. When accurate reference measurements or adjustments are to be made through the utilization of an electrolytic potentiometer, it is necessary to maintain its environmental temperature at a fixed or constant level. This is necessary since the response of the electrolytic potentiometer depends upon the temperature of the electrolyte in the device and any change in the temperature of the electrolytic potentiometer causes the viscosity and surface tension of the electrolyte to change. The response of the electrolytic potentiometer is directly related to the viscosity and surface tension of the electrolytic fluid and therefore variations in temperature are to be avoided.

Temperature-regulating devices for thermally sensitive components are known and are often found in various instruments and apparatuses. Prior art temperature-regulating devices take various forms from the simplest device, such as a fan whose speed is controlled, to more sophisticated devices. One such later device consists of a Peltier junction with the current flow through the junction being controlled in response to the temperature of the junction. While a temperature-regulating device of the Peltier junction type is satisfactory, it has a limited capacity. Further it requires a considerable amount of auxiliary equipment to control the current flow through the junction.

In addition to the above requirements, any temperature-regulating device should, if possible, be of relatively simple construction and ruggedly constructed. These requirements can be most easily achieved through the use of relatively simple components disposed in an apparatus which requires no critical adjustments. When these objectives are met it results in an apparatus that is relatively trouble-free and economical to construct.

Summary of the invention

A general and improved temperature-regulating device can be provided by utilizing the heat dissipated by a power transistor to heat a thermally sensitive component to be stabilized and lower ambient temperature to cool it. By controlling the conduction of the power transistor in response to the measured temperature of the thermally sensitive component, the component can be maintained at a constant temperature so its reference indication will not drift. It is, of course, necessary to operate the apparatus at, or slightly above, the ambient temperature to utilize the ambient atmosphere as a cooling environment. The system's temperature can be sensed by various means, as for example a semiconductor thermistor. Normally the thermistor is mounted in heat-transfer relationship with the power transistor and is used to control the conduction of the power transistor through appropriate circuits. Thus, the temperature of the power transistor and adjacent components can be maintained at a constant temperature by adding sufficient heat to the system through the power transistor to keep the temperature above ambient. The thermally sensitive component is mounted in the system in heat-transfer relationship with the power transistor and in effect serves as a heat sink for the power transistor.

Thus, the invention provides a simple device which is rugged and free of critical or special adjustments. The use of semiconductor or solid-state devices provides a reliable trouble-free apparatus. Further, the entire device may be easily encapsulated in a potting compound to protect it from physical damage.

Brief description of the drawings

FIG. 1 is a front elevation of a temperature-regulating device constructed in accordance with this invention with the thermally sensitive component removed;

FIG. 2 is a side view of the device shown in FIG. 1 with the thermally sensitive component mounted thereon; and FIG. 3 is a schematic drawing of the circuit shown in FIGS. 1 and 2.

Description of an embodiment

Referring to FIGS. 1 and 2 there is shown a temperature-controlling unit constructed in accordance with this invention. The device incorporates a mounting board, preferably a printed circuit board 10 on which the components of the system are mounted. A power transistor 11 is mounted on the board by any desired means, such as small bolts. The term "power transistor" as used in this specification refers to a transistor that will dissipate at least one-half watt of electrical power. Of course, the actual size of the power transistor will depend upon the physical characteristics of the thermally sensitive component whose temperature is to be regulated or controlled. Thus, in some cases where a relatively small electronic component is controlled, as for example the reference junction of a thermocouple, a smaller power transistor may be used. Similarly, if a relatively large component is controlled, as for example, an electrolytic potentiometer, a larger power transistor is necessary.

In selecting the size of a transistor the desired warm-up time and the speed of response must be considered. Obviously, the larger the power transistor, the shorter will be the warm-up time and the faster will be the response of the system to changes in the controlled temperature.

The temperature of the power transistor 11 is sensed by means of a semiconductor thermistor 12 which is mounted in a heat transfer relationship with the power transistor. While the thermistor is shown as being in physical contact with the power transistor it is only required that it be mounted in a good heat-conducting relationship to the power transistor. This can be achieved by heat sink compounds or encapsulating the entire circuit, including the power transistor and the thermistor in a suitable heat-conducting material, as for example, clear electrical potting material.

Also shown mounted on the printed circuit board is a control transistor 13 that serves to control the conduction of the power transistor, as explained below. The control transistor can be a conventional control transistor and is isolated from the thermally stabilized system so any heat dissipated by it will not affect the system. Also shown in FIG. 2 in a dashed outline is an electrolytic potentiometer 14 to illustrate the physical mounting relationships. The potentiometer is held in position by means of spring clips 15 and 16 (illustrated with broken lines) at opposite ends. The spring clips 15 and 16 are attached to the printed circuit board 10 by any suitable means so the electrolytic potentiometer will be disposed in a heat-conducting relationship with the power transistor. The encapsulating of the entire circuit insures that various elements are in a good heat-conducting relationship, and in addition, protects the various components from mechanical or physical damage.

Referring now to FIG. 3 there is shown a schematic diagram of the actual circuit 19 used in this invention. This circuit utilizes a conventional battery 20 for powering the various components, eliminating the need for multiple voltage sources. Since considerable power can be dissipated through the power transistor 11 the battery must have sufficient capacity to power the circuit or be associated with charging circuits. The positive side of the battery is connected to a positive power bus 27 of the circuit, while the negative side or grounded side is connected to a negative bus 28. A resistance 22 is coupled between the positive and negative power buses via a parallel network including a voltage-dividing circuit, consisting of the thermistor 12 and a resistance 24, and a Zener diode 23. Voltage drop across the voltage-dividing circuit is controlled by a Zener diode 23 disposed in parallel with the voltage-dividing circuit. Thus, as the temperature of the system changes the resistance of the thermistor will vary and in turn the voltage at the junction 29 will vary. The current through the Zener diode 23 and the voltage-dividing circuit is controlled by the resistance 22.

The base of the control transistor 13 is coupled to the junction 29 through a Zener diode 25 to control the conduction of the transistor 13. When the voltage at the junction 29 exceeds the breakdown voltage of the Zener diode 25, it will conduct and cause the control transistor to conduct. A resistance 26 is coupled between the base of the control transistor and ground to maintain a current flow through the Zener diode 25 and this resistor should be sized to cause sufficient current flow through the Zener diode to insure that it operates above its voltage knee, to stabilize the operation of the circuit. The collector of the control transistor is coupled to the positive power bus 27 through a resistance 30 and limits the current flow through both the power and control transistors. The base of the power transistor is coupled to the collector of the control transistor, while the collector of the power transistor is coupled to the positive power bus. The emitter of the power transistor is coupled to the ground bus 28 through a resistance 36. In addition, two diodes 33 and 34 are serially coupled between the base of the power transistor and the ground bus, which in combination with the resistance 36, limit the current flow through the power transistor and provide a protective circuit for the power transistor. A capacitor 31 is disposed between the base and collector of the power transistor to provide a filtering action and remove unwanted noise from the system.

*Operation of the invention*

The operation of the circuit shown in FIG. 3 will be described by assuming that the temperature sensed by the thermistor 12 has increased which will cause the resistance of the thermistor 12 to decrease. Since the thermistor 12 and the resistance 24 form a voltage-dividing circuit any decrease in the resistance of the thermister 12 will cause the voltage at the junction 29 to increase. When the voltage at the junction reaches the breakdown voltage of the Zener diode 25, the Zener diode 25 will conduct and cause the control transistor 13 to conduct. When the control transistor conducts, the current flow through the control transistor will reduce the current flow through the power transistor 11. Since the resistance 30 limits the total current flow through the power transistor and control transistor, it will lower the current flow below the cutoff point of the power transistor 11. Thus, the power transistor will cease to conduct which will stop its dissipation of heat. This will permit the lower ambient atmosphere to cool the complete system, including the electrolytic potentiometer 14.

As the ambient atmosphere cools the system the temperature of the thermistor 12 is lowered, increasing its resistance, which decreases the voltage at the junction 29. When the voltage at the junction falls below the breakdown voltage of the Zener diode 25, the Zener diode will cease to conduct and the control transistor will be cut off. When the control transistor cuts off, the current flow through the power transistor will again exceed the level at which the power transistor 11 will conduct. When this occurs, the power transistor will conduct and dissipate heat through its collector and this dissipation of the heat on the power transistor will heat the entire device, including things in heat transfer relationship with it, such as the electrolytic potentiometer illustrated.

The circuit will continue to cycle in a narrow temperature range and will maintain the temperature of the electrolytic potentiometer or other thermal-sensitive component within a range of $\pm 0.5°$ F. While the circuit described above is designed for a constant operating temperature, the operating temperature can be varied by substituting a variable resistance for the resistance 24. This will permit the change of an operating temperature.

What is claimed is:

1. A temperature regulating device for maintaining small control elements which are sensitive to temperature change at a constant temperature above ambient temperature, said device comprising:

a power transistor mounted in a physical heat conducting relationship with said control element;

a semiconductor thermistor, said thermistor being mounted in a physical heat transfer relationship with the resulting combined control element and power transistor;

a voltage dividing circuit, said voltage dividing circuit being formed by said thermister and a fixed resistance; and a control transistor, the base of said control transistor being coupled to said voltage dividing circuit, the collector of said control transistor being coupled to the base of said power transistor to control the conduction therethrough, whereby the control element is maintained at a preselected temperature above ambient.

2. The temperature regulating device as defined in claim 1 wherein the control element is an electrolytic potentiometer.

References Cited

UNITED STATES PATENTS

| 2,975,260 | 3/1961 | Carlson | 219—501 |
| 3,231,750 | 1/1966 | Burley | 219—501 |
| 3,300,623 | 1/1967 | Smyrnos | 219—501 |
| 3,308,271 | 3/1967 | Hilbiber. | |

BERNARD A. GILHEANY, *Primary Examiner.*

F. E. BELL, *Assistant Examiner.*